United States Patent
Baumann et al.

(10) Patent No.: US 6,757,958 B1
(45) Date of Patent: Jul. 6, 2004

(54) LOAD HANDLER WITH MODULAR FRAME ASSEMBLY

(75) Inventors: James A. Baumann, Kohler, WI (US); Richard F. King, Port Washington, WI (US); David Petrovic, Grafton, WI (US); Phil Schaffner, Cedar Grove, WI (US)

(73) Assignee: JLG OmniQuip, Inc., Port Washington, WI (US)

( * ) Notice: Subject to any disclaimer, the term of this patent is extended or adjusted under 35 U.S.C. 154(b) by 0 days.

(21) Appl. No.: 09/568,798

(22) Filed: May 11, 2000

(51) Int. Cl.$^7$ ............................................... B23P 21/00
(52) U.S. Cl. .................. 29/469; 29/897.2; 29/401.1; 29/428; 180/291; 296/193.04
(58) Field of Search .................. 29/469, 897.2, 29/426.1, 428, 401.1; 180/291, 6.48, 68.4

(56) References Cited

U.S. PATENT DOCUMENTS

| | | | |
|---|---|---|---|
| 3,131,493 A | 5/1964 | Le Tourneau | |
| 3,799,362 A | 3/1974 | Oswald et al. | |
| 3,895,728 A | 7/1975 | Heggen | |
| 4,151,920 A | 5/1979 | Shoup | |
| 4,215,971 A | 8/1980 | Itey-Bernard | |
| 4,224,818 A | 9/1980 | Jones et al. | |
| 4,290,642 A | 9/1981 | Wise | |
| 4,415,181 A | 11/1983 | McCall et al. | |
| 4,621,973 A | 11/1986 | Langenfeld et al. | |
| 4,865,378 A * | 9/1989 | Filtri et al. ................. | 296/197 |
| 4,874,285 A | 10/1989 | Bubik | |
| 4,900,083 A * | 2/1990 | Kumasaka et al. ......... | 296/197 |
| 4,930,972 A | 6/1990 | Little | |
| 4,958,844 A | 9/1990 | Hancock | |
| 4,986,721 A | 1/1991 | Lowder et al. | |
| 5,090,105 A * | 2/1992 | DeRees ....................... | 29/469 |
| 5,123,805 A | 6/1992 | Ishimori et al. | |
| 5,203,194 A | 4/1993 | Marquardt | |
| 5,255,752 A | 10/1993 | Nakamura et al. | |
| 5,322,208 A | 6/1994 | Hinrichs et al. | |
| 5,478,192 A | 12/1995 | Bentivoglio | |
| 5,718,048 A * | 2/1998 | Horton et al. ............. | 29/897.2 |
| 5,794,398 A | 8/1998 | Kaehler et al. | |
| 5,944,130 A | 8/1999 | Sewell | |
| 6,098,739 A | 8/2000 | Anderson et al. | |
| 6,099,194 A | 8/2000 | Durand | |
| 6,108,907 A | 8/2000 | Anderson et al. | |
| 6,205,665 B1 | 3/2001 | Anderson et al. | |
| 6,234,568 B1 | 5/2001 | Aoki | |
| 6,264,241 B1 | 7/2001 | Horiuchi | |

FOREIGN PATENT DOCUMENTS

| | | |
|---|---|---|
| EP | 0 043 228 | 1/1982 |
| EP | 0867 566 A2 | 9/1998 |

* cited by examiner

Primary Examiner—I Cuda Rosenbaum
Assistant Examiner—Stephen Kenny
(74) Attorney, Agent, or Firm—Dickstein Shapiro Morin & Oshinsky LLP (57) ABSTRACT

A load handler with a modular frame and the manufacture and assembly of the frame and loader and components that may be used therein. A frame is provided that has a low pivot point for a boom that may be lowered to a position within the frame. The frame has left and right side rails, and front and rear cross rails, each having a closed cross-section construction. The side rails and cross rails are modular and the cross rails of a selected size are configured to fit a plurality of sizes of side rails, such that the same size cross rails may be used to construct a variety sizes and capabilities of load handling vehicles in a flow type manufacturing process.

A structural beam is provided having plates interconnected along their lengths to form the beam having a box-shaped closed cross-section having a perimeter generally along the widths of the plates and forming a beam cavity within the perimeter. A first plate has a width greater than the width of an opposed second plate, and the plates are positioned to form a plurality of welding land inside corners along the length of the beam. A corresponding weld is formed simultaneously with a single pass at all of the welding land inside corners along the lengths thereof to interconnect the plates to form the structural beam.

36 Claims, 8 Drawing Sheets

LOAD HANDLER WITH MODULAR FRAME ASSEMBLY

BACKGROUND

The present invention relates generally to material handling equipment, including but not limited to mobile machinery of the type used for material handling jobs that require moving or positioning of a load. In particular, the present invention relates to a load handler with a modular frame and the manufacture and assembly of the frame and loader and components that may be used therein.

In construction jobs, it is desirable to lift heavy loads such as equipment, building materials, or earth, and to move, position or place the loads at other locations. This may require movement of a load high above and forward from the loader. Load handling vehicles, also referred to as loaders, loader vehicles or load handlers, employ pivoting booms that may be raised or lowered about a pivot point on the loader frame, and may be telescoped to move the load to the desired position. Attachments for the booms may be used for performing various jobs. For example, fork and bucket attachments may be used for moving materials like bricks or earth. Other attachments may be used for pouring concrete, handling roof trusses, boring holes in the earth, or other tasks.

The capability of loader vehicles is measured in some respects by how heavy a load it can lift and how high it can lift a load. For example, loaders may lift loads weighing up to twenty to sixty thousand pounds or more, to heights of up to twenty to one hundred feet or higher. The factors affecting the loader capability include, for example, the strength of the boom structure, the power of hydraulic cylinders for lifting and telescoping the boom, and the stability of the loader vehicle against tipping over. The stability depends on factors such as the weight of the loader vehicle, the positioning of the boom pivot point on the vehicle, the front to back and side to side spacing of the wheels, and the center of gravity of the load and vehicle.

In use, a load handling vehicle is subjected to tremendous stress forces resulting from the positioning of heavy loads at the end of the boom. These stress forces include twisting forces about the longitudinal axis of the frame of the vehicle. Depending on the work site conditions, the load handler may have to travel over or stand on uneven surfaces while carrying or positioning the load. This may increase the stress forces, such as due to leveling forces exerted by stabilizing hydraulic cylinders acting between the axles and the vehicle frame. Consequently, the vehicle frame may be subjected to compound bending and twisting stress forces due to the heavy loads and movement. The vehicle frame is desirably constructed with sufficient stiffness and torsion strength to withstand these forces without experiencing unacceptable deformation.

To achieve sufficient stiffness and torsion strength, frames for loader vehicles have been built using a box-shaped generally closed overall frame cross-section configuration. Although such a configuration provides good stiffness, the box shape may require that the boom pivot point be positioned relatively high. A relatively lower boom pivot point may be desirable to lower the center of gravity to increase stability of the vehicle. Some load handlers are configured to achieve a low boom pivot point by mounting the vehicle engine and operator cab to the sides of the vehicle with the boom nestled between them in the boom's lowered position. This configuration also provides a good field of vision for the operator in many uses of the load handler. However, to accommodate the lower boom position, the top of the box-shaped closed overall frame cross-section configuration may have to be opened up to an extent, thus adversely affecting stiffness and torsion strength. For example, such opened frames may lose stiffness and torsion strength particularly with respect to twisting forces along the vehicle front to rear longitudinal axis, with twisting occurring along the length of the frame's longitudinal structural beam members, or side rails.

In addition, the frames of load handling vehicles are commonly made in a unitary construction with components particularly designed for a particular vehicle capability. The frames are assembled using a "cell" type manufacturing process in which all the components for the frame of the vehicle are brought to a location and all the components are assembled at that location. Such an assembly process is relatively inefficient in that it requires dedicated floor space for extended periods of lead time during assembly.

SUMMARY

The present invention provides a load handling vehicle, a structural frame and method of assembly using modular components. A frame is provided that has a low pivot point for a boom that may be lowered to a position within the frame. The frame has left and right side rails, and front and rear cross rails, each having a closed cross-section construction. The side rails and cross rails are modular and the cross rails of a selected size are configured to fit a plurality of sizes of side rails, such that the same size cross rails may be used to construct a variety sizes and capabilities of load handling vehicles in a flow type manufacturing process.

In one aspect, a structural beam is provided having plates interconnected along their lengths to form the beam having a box-shaped closed cross-section having a perimeter generally along the widths of the plates and forming a beam cavity within the perimeter. A first plate has a width greater than the width of an opposed second plate, and the plates are positioned to form a plurality of welding land inside corners along the length of the beam. A corresponding weld is formed simultaneously with a single pass at all of the welding land inside corners along the lengths thereof to interconnect the plates to form the structural beam.

In one aspect a motorized four-wheeled telescoping boom load handling vehicle has a modular longitudinally extending frame. The boom is pivotally secured to the carriage at one end and pivotally supports load handling means such as a fork carriage or crane hook or grapple, or the like, at the other end. Cylinders may be provided for elevating and lowering the boom relative to the carriage and for extending and retracting the boom segments. The various power means can be actuated selectively to extend and retract the boom and to raise and lower the boom.

In another aspect, a leveling system may be provided to maintain the frame level through all operating positions.

In another aspect, a frame is provided that has a low pivot point for a boom that may be lowered to a position within the frame. The frame includes closed section shaped side rails and cross rails. In another aspect of the invention, the frame is for a load handling vehicle.

In another aspect, a structural frame is provided having: a left side rail and a right side rail, each having a closed cross-section and a front end and a rear end; a front cross rail having a closed cross-section is rigidly affixed between the side rails at a forward location; and a rear cross rail having a closed cross-section is rigidly affixed between the side rails at a rearward location.

In another aspect, the structural frame side rails include: a first plate, a second plate, a third plate and a fourth plate; each of the plates having respectively a length, a width, and a thickness; the first and second plates being arranged in an opposed position to one another, and the second and third plates being arranged in an opposed position to one another; the plates being interconnected along their lengths to form the rail having a box-shaped cross-section having a perimeter generally along the widths of the plates and having a rail cavity within the perimeter; the first plate width being greater than the second plate width, and the plates are positioned with the widths of the third and fourth plates extending between, abutting and positioned generally traverse to the widths of the first and second plates, to form a plurality of welding land inside corners along the length of the side rails; a corresponding weld is formed at each of said welding land inside corners along the lengths thereof to interconnect the plates.

In another aspect, the frame is adapted for a load handling vehicle and the rails include the side rails of the vehicle.

In another aspect, the side rails and cross rails are modular and the cross rails of a selected size are configured to fit a plurality of sizes of side rails, such that the same size cross rails may be used to construct a variety sizes and capabilities of load handling vehicles.

In another aspect a method for manufacturing a structural frame apparatus is provided including the steps of: assembling modular components of a frame; stocking the components for later use; selecting a capability for a frame; choosing the modular components for configuring the selected frame; retrieving from stock components for a subassembly of a frame; assembling the components for the selected subassembly; and if the product assembly is not completed, moving the product to the next assembly station and returning to and repeating the step of retrieving components for another subassembly and continuing the process until the frame assembly is completed.

In another aspect, the subassembly made by such method is a frame for a load handling vehicle.

In another aspect a structural beam is provided having a first plate, a second plate, a third plate and a fourth plate, each plate having respectively a length, a width, and a thickness, the first and second plates arranged in an opposed position to one another, the second and third plates arranged in an opposed position to one another, and the plates interconnected along their lengths to form the beam having a box-shaped closed cross-section having a perimeter generally along the widths of the plates and forming a beam cavity within the perimeter. The first plate width is greater than the second plate width, and the plates are positioned with the widths of the third and fourth plates extending between, abutting and positioned generally traverse to the widths of the first and second plates, to form a plurality of welding land inside corners along the length of the beam. A corresponding weld is formed at each of the welding land inside corners along the lengths thereof to interconnect the plates to form the structural beam.

In another aspect, a method for manufacturing a structural beam is provided including the steps of providing a first plate, a second plate, a third plate and a fourth plate. Each of said plates has respectively a length, a width, and a thickness. The first plate width is greater than the second plate width. The first and second plates are arranged in an opposed position to one another, and the second and third plates being arranged in an opposed position to one another, such that the plates are positioned with the widths of the third and fourth plates extending between, abutting and positioned generally traverse to the widths of said first and second plates, to form a plurality of welding land inside corners along the length of the beam. A corresponding weld is simultaneously formed at all of the welding land inside corners along the lengths thereof to interconnect the plates along their lengths to form the beam having a box-shaped closed cross-section, a perimeter generally along the widths of the plates, and a beam cavity within said perimeter.

These and other features and advantages of the invention will be more clearly understood from the following detailed description and drawings of preferred embodiments of the present invention.

DETAILED DESCRIPTION OF PREFERRED EMBODIMENTS

Figure 1:
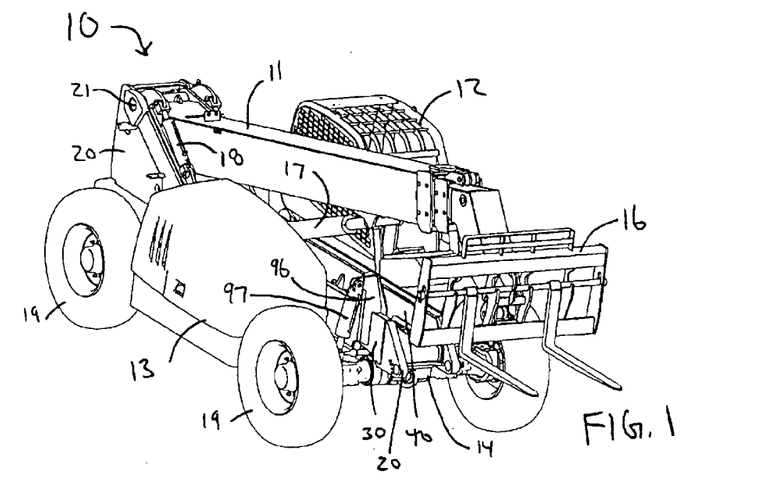
FIG. 1 is a perspective view of a load handler according to a preferred embodiment of the present invention.
Figure 2:
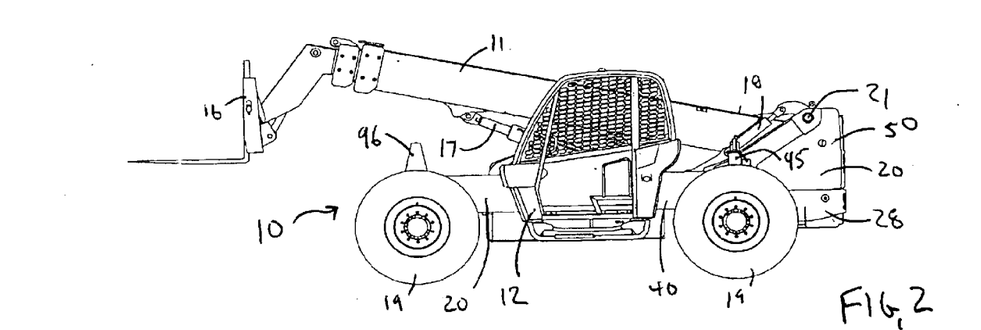
FIG. 2 is a left-side elevation view of the load handler of FIG. 1.
Figure 3:
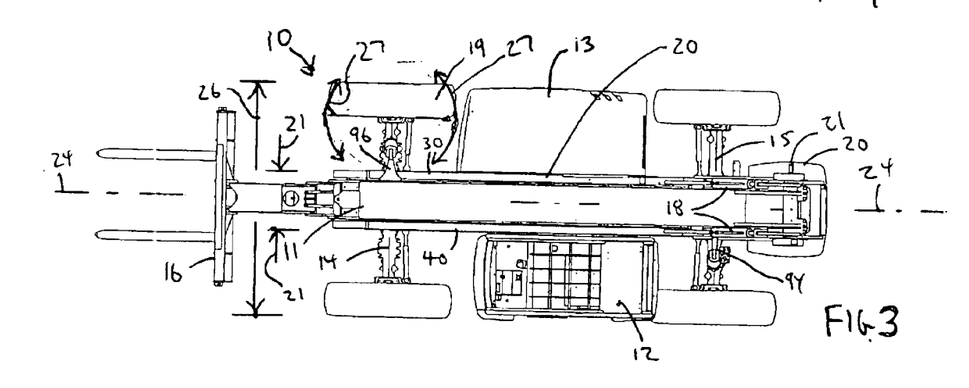
FIG. 3 is a top plan view of the load handler of FIG. 1.
Figure 4:
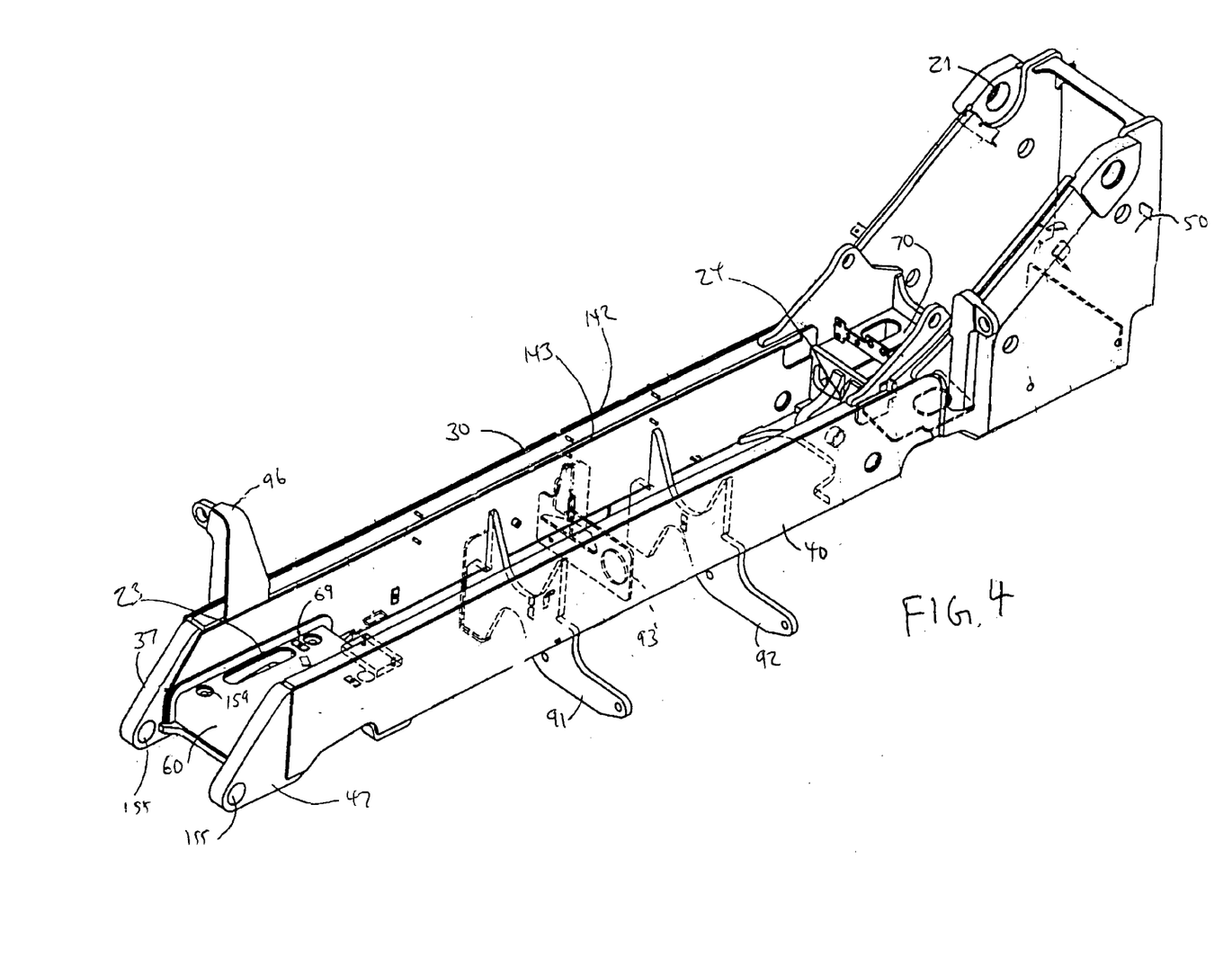
FIG. 4 is a perspective view of the frame of the load handler of FIG. 1.

Refer now to FIGS. 1 through 3, there being shown a load handler, generally designated by reference numeral 10, according to a preferred embodiment of the present invention. The load handler 10 includes a vehicle frame 20 supported on front and rear axles 14 and 15 equipped with front and rear tires and wheels 19. A load handling device such as a fork carriage 16 is pivotally supported at one end of an elongated telescoping boom 11 of generally rectangular cross section. The fork carriage 16 may be replaced by a crane hook (not shown) or other load handling attachment, depending upon the work to be performed by the load handler 10.

Figure 5:
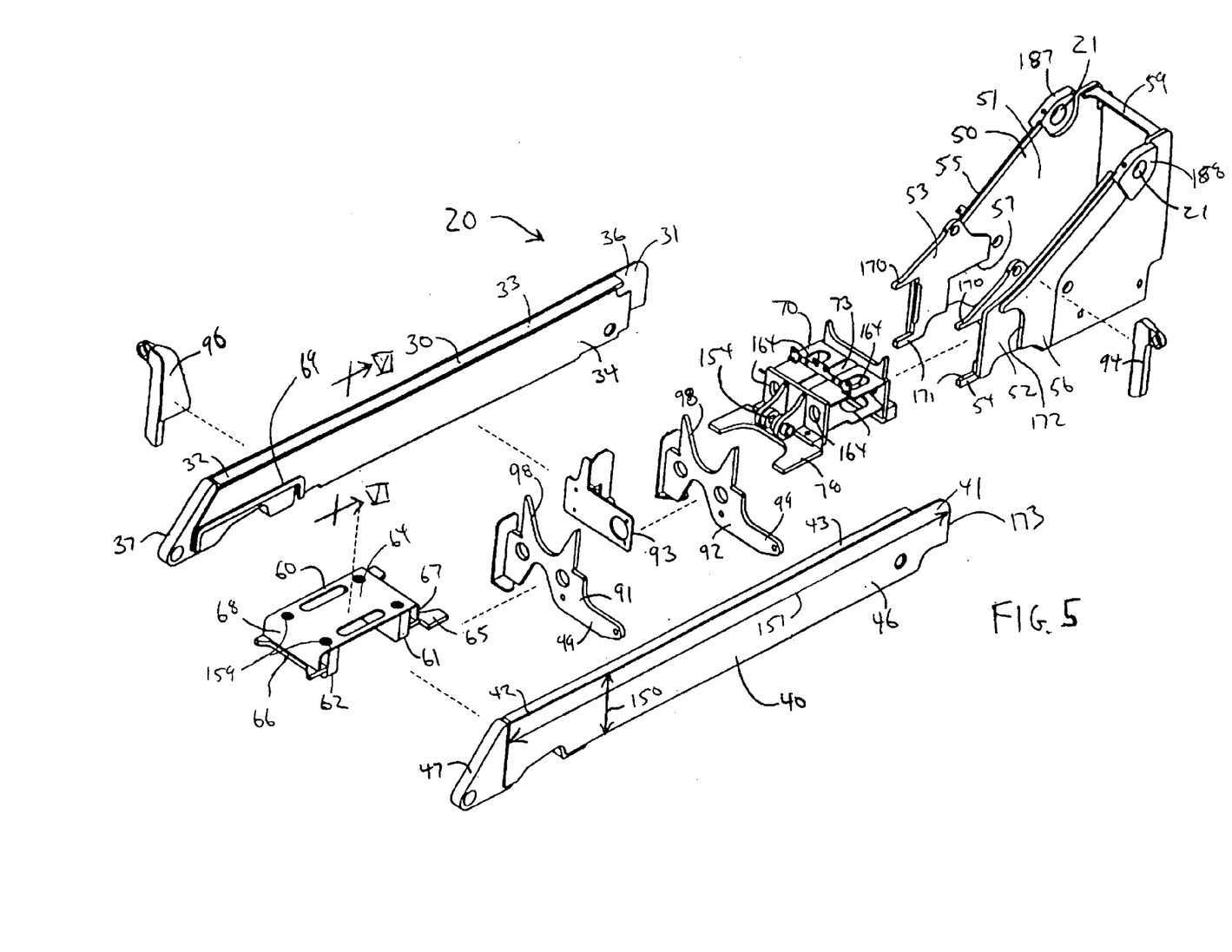
FIG. 5 is an exploded perspective view like FIG. 4.

In the illustrated embodiment, the vehicle 10 is configured with the operator cab 12 positioned on the left side of the frame 20 and the engine 13 mounted on the right side of the frame 20. The frame 20 provides a low pivot point axis 21 for the boom 11. The boom 11 may be lowered to lie nestled between the cab 12 and the engine 13 and within the structural members of the frame 20, generally along the direction of the longitudinal axis 24 of the frame and vehicle. The boom 11 is raised and lowered using a boom primary cylinder 17 attached to pivot at one end at the boom 11 and at the other end at the frame 20 at mount 154 (FIG. 5). The boom secondary cylinders 18 also aid in raising and lowering the boom 11. Additional hydraulic cylinder structure is positioned on the boom for telescoping the boom sections in and out.

The front and rear wheels 19 pivot at their connections to the front axle 14 and the rear axle 15 for tuning the vehicle. The front axle 14 and the rear axle 15 are each mounted to rotate or tilt to some extent with respect to the vehicle about the longitudinal axis 24 to accommodate uneven terrain while maintaining the boom and load in a more vertical position. The tilting of the axles 14 and 15 is controlled respectively by a front axle hydraulic cylinder 97 and a rear axle hydraulic cylinder 95. The front axle hydraulic cylinder 97 is connected at one end to pivot at the axle 14 and at the other end to pivot at a front tilt tower 97 of the frame 20. The rear axle hydraulic cylinder 95 is connected at one end to pivot at the rear axle 15 and at its other end to pivot at the rear stabilizing tower 94 of the frame 20. It can be seen that on uneven ground the action of these hydraulic cylinders to stabilize and to keep the frame in a more horizontal position about its longitudinal axis 24 incurs twisting stress forces on the frame 20. Particularly note that the primary boom hydraulic cylinder 17 is positioned below the boom 11 and, along with a portion of the boom 11, is received within the frame 20 between a frame left side rail 40 and a frame right side rail 30 which are described in more detail below.

Note particularly with respect to FIG. 3, that the overall width 26 of the vehicle 10 is limited by transportability restrictions, such as, for example, the width restrictions of trailers or cargo transporting containers for hauling the loader, and the width of the lanes of roads on which the loader may be driven. Accordingly, the wheels 19 may only be positioned outwardly from the frame 20 a limited distance. The clearance between the wheels and tires 19 and the overall width 21 of the frame 20 and the proximity of the wheels 19 will limit the extent of the arc 27 through which the wheels 19 may be turned. This will limit the turning radius of the vehicle 10. A shorter or tighter turning radius may be more desirable in many uses because the vehicle may have a limited area for maneuvering. To achieve a shorter turning radius, the wheels 19 should be turnable over a greater angle, i.e., over a larger arc 27. This may be achieved by providing more clearance space between the wheels 19 and the frame 20. Because the outer extent of the wheels 19 are limited by the transportation restrictions, to achieve a greater arc 27 it is desirable to narrow the overall width 21 of the frame 20. The frame 20 according to a preferred embodiment of the present invention provides a relatively narrow width 21 while achieving desired stiffness and torsional strength properties for the frame 20.

The boom pivot point 21 is provided at a low position at the rear module 50 of the frame 20. The low mounting of the boom and the over all balance of the design of the vehicles 10 achieve a low center of mass and allows the elimination of the use of hydrofill in the tires 19 for ballast weight. In the event a higher boom position is desired, the boom 11 can be fitted with its corresponding pivot (that mates with pivot 21) at a more downward position. A ballast weight 28 may be conveniently attached to the rear module 50 for adding overall weight to the vehicle for balancing the load and lowering the center of gravity of the vehicle and load.

Refer now to FIGS. 4 and 5 and 8 through 16 that illustrate a frame for a load handling vehicle according to a preferred embodiment of the present invention. The frame is generally designated by reference numeral 20. The frame 20 includes a right side rail 30 and a left side rail 40. The side rails or beams 30 and 40 have a generally closed cross section to achieve desired stiffness and torsion strength. In the illustrated embodiment, the closed section is box shaped. The side rails 30 and 40 are connected together at a forward location 23 by a front axle mount pod 60, and at a rearward location 24 by a rear module 50 and a rear axle mount pod 70. The front axle mount pod 60 and the rear axle mount pod 70 are each also formed using closed section type construction for achieving stiffness and torsion strength. The assembled frame 20, as well as its components, utilize closed sections to enhance stiffness and torsion strength of the components and the overall frame construction. For example, the left and right rails 30 and 40 joined with the axle mount pods 60 and 70 and the rear module 50 form a closed section in which the bulkhead frames 91 and 92 extend. Moreover the addition of the bulkhead frames 91 and 92 add to the closed section construction and to the stiffness and torsion strength, including with respect to twisting motion about the longitudinal axis 24.

The front axle mount pod 60 provides a mounting position for the front axle 14. The pod 60 is desirably stiff to support the axle 14 and withstand torquing, bending, twisting, and compound loading forces exerted by the axle 14. Pod 60 is modularly configured to accept a range of sizes of axles. The front axle mount pod 60 is also a structural frame cross rail or beam positioned to extend between the side rails or beams 30 and 40 at a forward location 23. In the illustrated embodiment, the forward location 23 is proximate the front ends 32 and 42 respectively of the side rails 30 and 40, however the forward location 23 could be selected at a more rearward location. The front axle mount pod 60 is constructed to form two closed sections 156 and 157 extending along its length, which extends along the width 21 of the frame 20 between the side rails 30 and 40. The front axle mount pod 60 includes a main upper plate 64, having a downwardly extending front arm 68 and a downwardly extending rear arm 67. Heavy solid bars 61 and 62 extend along the length of the pod 60 generally parallel with, but spaced from, the arms 67 and 68, and are attached under and to the plate 64. The axle 14 may be bolted to the bars 61 and 62, such as through bolt holes 159. A front lower plate 66 is attached to the front bar 62 and the front arm 68 to form the front closed section 157. A rear lower plate 65 is attached to the rear bar 61 and the rear arm 67 to form the rear closed section 156. A triangular closed section 63 (FIGS. 14 and 15) is formed by angle element 158 attached to the under surface of the main upper plate 64 and extends between and is attached to the bars 61 and 62. The boom 11 in its lowered position may rest on the plate 64 of the front axle mount pod 60, and elastomeric or other cushioning or wear surface supports may be provided between the boom 11 and plate 64.

The rear axle mount pod 70 provides a mounting position for the rear axle 15. The rear axle mount pod 70 is also a structural frame cross rail or beam positioned to extend between the side rails or beams 30 and 40 at a rearward location 24. In the illustrated embodiment, the rearward location 24 is proximate the rear ends 31 and 41 respectively of the side rails 30 and 40, however the rearward location 24 could be selected at a more forward or rearward location. The rear axle mount pod 70 is constructed to form a closed section 165 extending along its length, which extends along the width 21 of the frame 20 between the side rails 30 and 40 and between the plates 53 and 54 of the rear module 50.

The rear axle mount pod 70 includes a front plate 72 and a rear plate 71. Heavy solid bars 75 and 76 extend along the length of the pod 70 generally parallel with the plates 71 and 72, and are attached outside of and to the plates 71 and 72 respectively. The axle 15 may be bolted to the bars 75 and 76 such as through bolt holes 165. A front lower plate 78 is attached to the front bar 76 and the pivot. A mount 154 for cylinder 17 is attached to the plates 72 and 78 and the bar 76. The closed section 159 includes a left section 73, a right section 77 and a center section 74. The left section 73 includes a top plate 160 and a bottom plate 161 extending between and attached to the plates 71 and 72 and attached to the section 74. The center closed section 74 is tubular and extends between and is attached to plates 71 and 72. The right section 77 includes a top plate 162 and a bottom plate 163 extending between and attached to the plates 71 and 72 and attached to the section 74. Upon assembly of the ramp 70 to the near module 50, the sections 73 and 77 extend to and are attached to the rear module 50. The apertures 164 are formed to accommodate hydraulic hose and provides other access, as well as to strengthen the plates 71 and 72.

The rear module 50 includes a rear module right main plate 51 and a rear module left main plate 52 extending generally parallel with the axis 24 and connected it together by a rear module upper support 59 and a rear module lower support 58 extending across the width 21 of the frame 20 and attached to the rear module main plates 51 and 52. Attached to the inside front surfaces of the plates 51 and 52 are a rear module right slave ear plate 53 and a rear module left slave ear plate 54 respectively. The ear plates 53 and 54 include upper and lower projections 170 and 171 respectively to form a C-shaped recess for accepting and engaging the upper plates 33 and 43 and the lower plates 35 and 45 of the side rails 30 and 40 respectively. A strong C-shaped weld may be formed at the intersection for joining the rails 30 and 40 and the module 50. The rear module 50 further includes a rear module right side plate 55 and a rear module left side plate 56 attached to the outer surfaces of the plates 51 and 52 respectively. Reinforced lugs 187 and 188 are provided at the rear ends of the plates 55 and 56 for defining the pivot point 21 of the boom 11.

Note that the forward ends 172 of the plates 55 and 56 are contoured to abut, or come close to abutting and mate with the portions 173 of the rear ends 31 and 34 of the side rails 30 and 40 respectively. Also the rear ends of the plates 34 and 44 and the widths of the plates 33, 43, 35 and 45 are chosen to allow the plates 34 and 44 to overlap the inside surfaces of the rear module plates 53 and 54 for attachment thereto. This plate construction of modular components provides for an overlapping and strong joint of side rails 30 and 40 and the rear module 50. The various sizes of the various components of module 50 may be modified to accommodate different size rails 30 and 40 for different capacities of vehicle 10 as well as accommodate different size booms. Accordingly, a number of the components may be reused for various sizes and capabilities and configurations of vehicles tailor-made to a product order in an efficient flow type manufacturing process. The rear stabilizing tower 96 is welded to the rear modules left side plate of 56. Note also that in the rear module 50 as well as in other features of the frame 20, feathered contours such as leading to the ears 170 are utilized to provide strength and transition of forces through the flame. In addition, various apertures, such as aperture 164 are provided in components to allow accessibility for maintenance, routing of lines such as hydraulic lines and for strengthened the plate components. The plate 53 is provided with an under edge 57, that is sized to accept the top and the front of the rear module 70. Also the bottom of the ears 171 lay on the top surface of the plate 78 of the rear module 70 and may be welded thereto.

The left and right side rails are constructed in similar fashion by the welding together of four plates as described in more detail below with reference to FIG. 6. The right side rail 30 includes a right side rail upper wall plate 33 and a right side rail lower wall plate 35 (FIG. 6).

The forward bulkhead frame 91 and the rear bulkhead frame 92 are welded to the inside surfaces of the side rails 30 and 40 and have portions 99 extending to the left side of the frame 20 to support the cab 12. The bulkhead frames 91 and 92 each have upper recesses 98 sized to accommodate the hydraulic cylinder 17 and boom 11 in its lowered position. A transfer box mount 93 is also welded between the rails 30 and 40 for mounting a transfer box in the drive train of the vehicle 10 for transmitting power from the engine to the front and rear axles 14 and 15. The front tilt tower 96 is mounted to the right side rail 30 proximate the location of the front axle mount pod 60. The rear stabilizing tower 94 is welded to the rear module 50. The right side rail 30 includes a right side rail inner wall 34 and a right side rail outer wall 36. The inner wall 34 and the outer wall 36 are connected together with a right side rail upper wall 33 and right side rail lower wall 35 to form a generally box shaped closed cross section, as described further with reference to FIG. 6. At the right side rail front end 32 a right side rail plug or shoe 37 is inserted into the cavity 38. The plugs or shoes 37 and 47 are shaped and sized to accommodate the axle 14 and to provide desired ballast weight to the front end of the vehicle 10. The holes 155 are provided on the plugs 37 and 47 for towing and handling of the frame and vehicle during assembly and transport. The shape of the plug 37 desirably forms a suitably sized reinforced closed cross-section support for the front tilt tower 96. The front tilt tower 96 has a recess 156 for accepting an edge of wall plate 36 and a lip 157 for engaging the edge 104 of the wall plate 33, while the front tilt tower abuts the plates 33 and 36 along a desired extent for welding. The recess 156 and lip 157 to some extent support and align the front tilt tower 96 while it is attached to the side rail 30.

Upon assembly of the various components of the frame 20, the side rail cavities 38 and 48 (FIG. 15) are sealed and may be used to function as gas pressure relief tanks in connection with the hydraulic fluid system for the various hydraulic cylinders of the vehicle 10.

Figure 6:
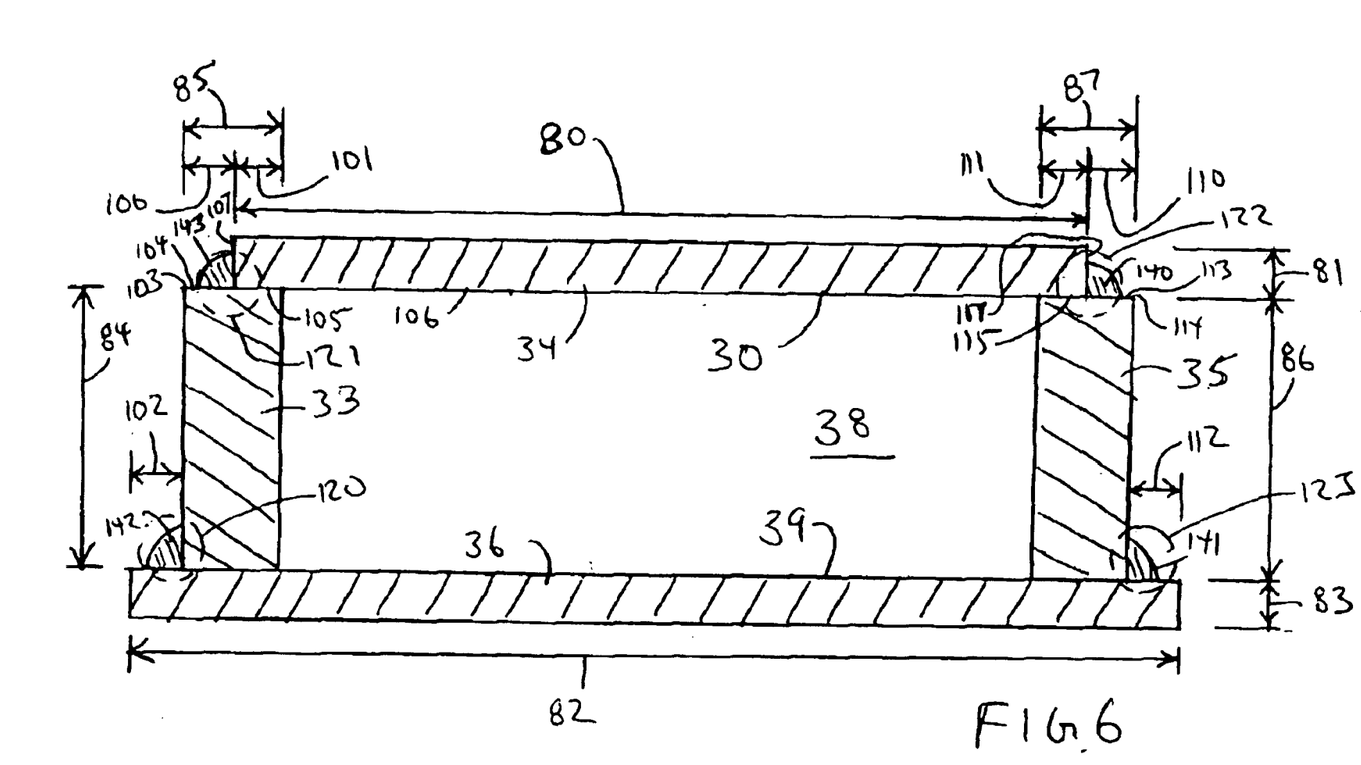
FIG. 6 is a view taken along section line VI—VI of FIG. 5.

Refer now to FIG. 6 which illustrates a cross section of the right side rail or beam 30 of the described embodiment. The left side rail 40 is constructed in a similar fashion. The right side rail 30 is oriented in FIG. 6 with its outer wall 36 at the bottom of FIG. 6 to aid in discussion of the method of assembly of the side rail 30. The side rail 30 has generally a closed cross section with a cavity 38 formed by the various walls which define a perimeter of the beam 30, the inside perimeter being designated by reference numeral 39. The lower wall plate 35 has a width 86 and a thickness 87. The walls 33, 34, 35 and 36 also have respective lengths in the direction of the longitudinal axis 24 of the vehicle. The overall length 151 (FIG. 5) of the rails or beams 30 and 40 may be longer than the length of one or more of the walls of the beams. The right side rail upper wall 33 has a width 84 and a thickness 85. The right side rail outer plate or wall 36 has a width 82 and a thickness 83. The right side rail inner wall or plate 34 has a width 80 and a thickness 81. The thicknesses generally extend across the edges of the plates.

Note that in the illustrated embodiment the width 80 of the right side rail inner plate 34 is a shorter than the width 82 of the right side rail outer plate 36. The width 80 and 82 are chosen, along with the thicknesses 85 and 87 of the upper and lower wall plates respectively, in achieving a welded construction with desired stiffness and torsion strength. As shown in FIG. 6 the walls or plates 33 and 35 are positioned over the outer right side rail wall or plate 36 set back by distances 102 and 112 respectively, to form inside welding corners for effecting the welds 141 and 142. These welding corners are in the regions of the dash line circles designated 120 and 123. Similarly, the plate or wall 34 is positioned with respect to the thickness of the plates 33 and 35 to form welding inside corners for effecting welds 143 and 140 in the regions 121 and 122. Although the welding regions are identified by the circles, they are not limited to within that circle, but, rather, the circle designates the general region of the welding inside corner. Typical welds may be about five sixteenths of an inch or as desired. Also, although the welds 141, 142, 143 and 144 are shown as beads in cross section and just residing in the corner, as materials are welded together, they fuse together and that fusion extends below the surfaces of the materials. That fusion is not shown in FIG. 6 for clarity of understanding of discussion of the overlap of the various dimensions of the plates or walls 33, 34, 35 and 36. Note that the inside weld corners 120, 121, 122 and 123 extend generally along the length of the right side rail 30. Because of the requirements for the frame right side rail, all of the walls 33, 34, 35 and 36 may not have the same length or may have interruptions in their length to accommodate their particular requirements for the purpose for which the side rail is used. In the illustrated embodiment, such purpose is the construction of a frame for a load handling vehicle. In one aspect, the rail or beam construction described herein may be used as shown in the illustrated embodiment, or modified, for purposes other than for the described frame and vehicle embodiments.

The inside welding corner 120 has a dimension 102 defined by the positioning or abutting of a non-edge surface of the wall 33 with respect to a non-edge surface of the wall 36 and opens up and to the left of FIG. 6. Similarly, the inside welding corner 123 has a dimension 112 defined by the positioning or abutting of a non-edge surface of the wall 35 with respect to a non-edge surface of the wall 36 and opens up and to the right of FIG. 6. The inside welding corner 121 has a dimension 100 corresponding to the positioning or abutting of an edge surface of the wall 34 with respect to an edge surface of the wall 33 and opens up and to the left of FIG. 6. Similarly the inside welding corner 122 has a dimension 110 that is determined by the positioning or abutting of an edge surface of the wall 34 with respect to an edge surface of the wall 35 and opens up and to the right of FIG. 6. All of the welding corners open in an approximately common direction of upwards, or from the plate 36 towards the plate 34, in the illustrated embodiment. The inside corner 121 and the inside corner 122 each have a dimension 81 corresponding to the thickness of the plate 34. The dimensions 81, 110, 100, 102 and 112 are chosen to give sufficient welding inside corner surface area to effect the welds 140, 141, 142 and 143. The thicknesses 81 and 83 are also chosen considering the desired stiffness of the overall beam or rail 30. Similarly the thicknesses of the plates 33 and 35 are chosen to provide not only the sufficient inside corner surfaces or lands 104 and 114, but also sufficient overlaps 105 and 115, having dimension 101 and 111 with the inside surface 106 of plate 34. Also it may be desirable to maintain the ratio of dimension 100 to the dimension 101 as well as the ratio of the dimension 110 to the dimension 111 equal to a greater than one to one, because of lower ratios, as the dimensions 100 and 110 become relatively smaller, the beam 30 may tend to spread apart somewhat because of heat expansion.

Generally the thicknesses of the plates or walls 33 and 35 will be thicker than the plates or walls 34 and 36. If the thickness of the walls 33 and 35 are sufficiently high, splitting or fracture of the material of plates 33 and 35 may be experienced during welding, for some materials. When using steel, this splitting may be alleviated to an extent by using cold rolled bars preformed flats or cold finished flats, for the thicker plates 33 and 35, which bars or flats have not been cut with heat prior to the welding process. The cutting of the bars with heat may weaken them and make them more susceptible to the splitting during the welding process. It is desirable that a sufficiently smooth surface be present on the inside welding corners such as on edges 103 and 113 of bars or plates 33 and 35 respectively and the edges 107 and 117 of the plate 34. A "125" edge finish (sometimes referred to as a microfinish) or smoother has been found acceptable, however, rougher or smoother finishes may be acceptable for various applications. With the construction shown, the thicknesses 83 and 81 of the plates 34 and 36 may be small enough so that the plates may be cut and shaped for fitting into the vehicle frame 20 or other application of the beam 30, without experiencing the splitting effect upon welding. For example, a one and one-half inch thick steel plate may not experience the splitting effect upon welding, whereas a one-half inch thick steel plate may. This may vary with the steel alloy and quality.

Also as shown in FIG. 6 the inside welding corners 120, 121, 122 and 123 all open towards the top of the figure. This is beneficial in the manufacturing process so that the entire beam or rail 30 may be welded in a single pass using an automated welding machine, such as a Peck welding machine with four welding guns. Thus, the beam may be positioned and oriented as shown in FIG. 6 with the plate 36 resting on the table of the welding machine and all four of the welds 140, 141, 142 and 143 effected simultaneously with a single pass of the welding machine over the beam 30. The respective welds may be continuous unless a break is desired because of the contours of the plates, or otherwise. This has been found to provide a highly stiff structural beam 30 in an efficient process. Also, the components of the beam may be modified to make modular components for the frame construction. Particularly the widths 80 and 82 of the plates 34 and 36 respectively may be adjusted to increase the stiffness of the beam particularly in the direction of the widths. This corresponds to the vertical direction and rail height 159 as shown in FIG. 5 of the illustrated embodiment of the vehicle 10. Thus, the widths and the lengths as well as thickness of the component parts of the beam 30 as well as beam 40 may be conveniently changed to accommodate different load capacities to torsion strength and stiffness for the beams as well as for the frame 20 and the vehicle 10 of the illustrated embodiment.

Upon assembly of the beam 30 with such welding technique and with the plate 36 being wider than plate 34 (a so called "top hat" configuration), it has been found that the beam along its length may experience a slight sweep or bow (FIG. 10) with the wider plate 36 on the outside of the curvature. This may be desirable for assembling the frame as described in more detail below. The side rail 40 is constructed in a manner similar to the side rail 30.

Figure 7:
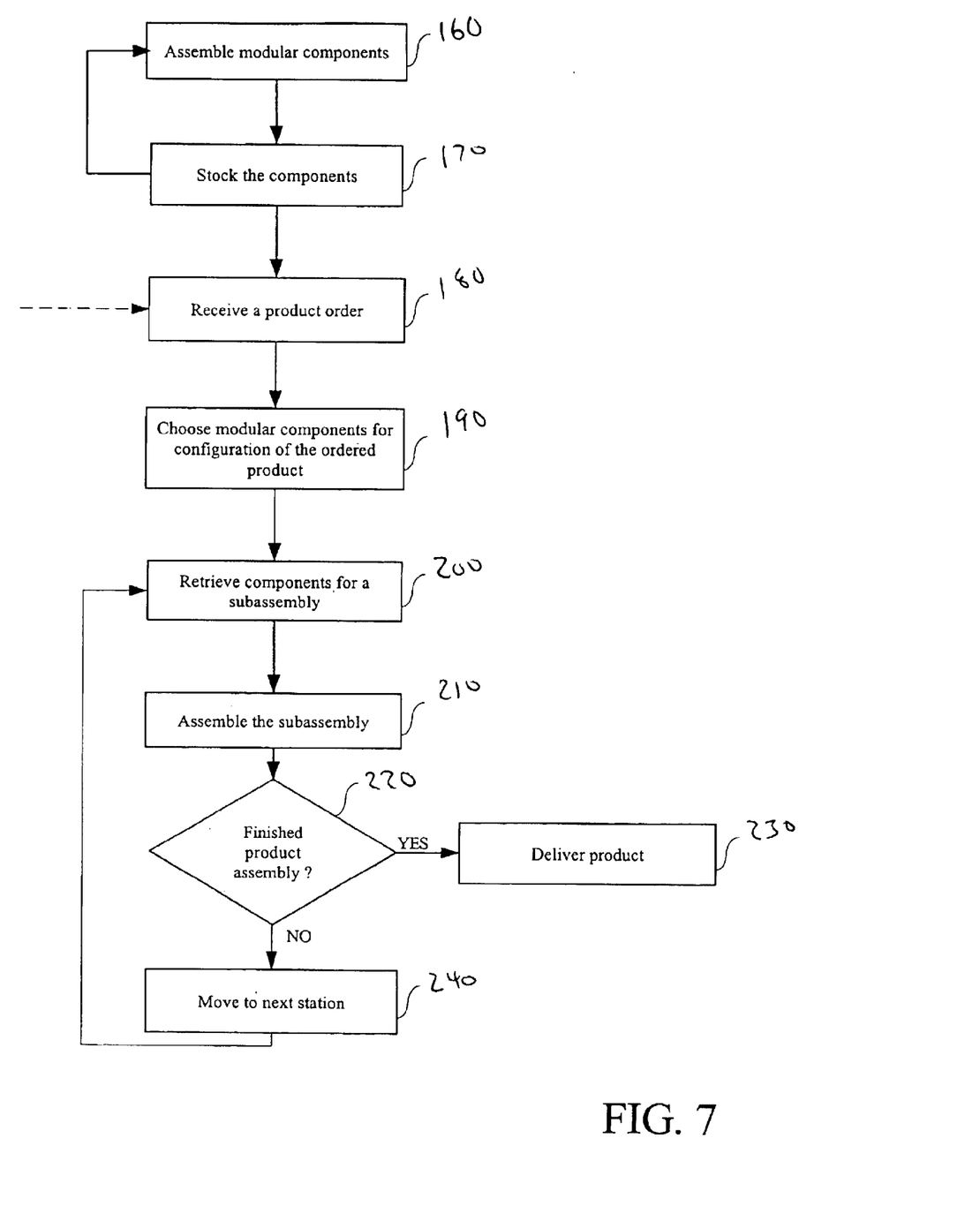
FIG. 7 is a flow chart illustrating a method of assembly according to a preferred embodiment of the present invention.
Figure 8:
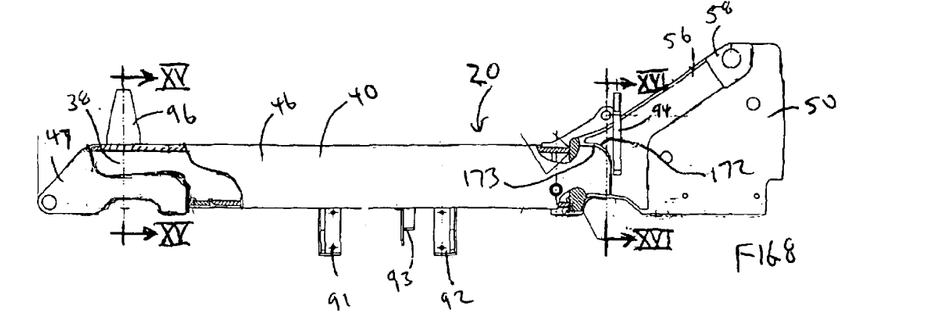
FIG. 8 is a left side elevation view of the frame of FIG. 4.
Figure 9:
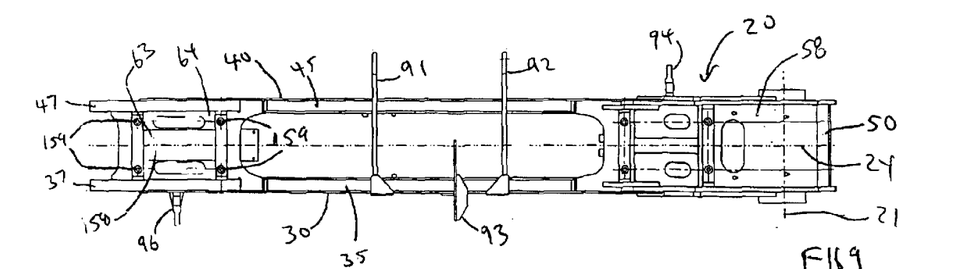
FIG. 9 is a bottom plan view of the frame of FIG. 4.

Refer now to FIG. 7 which shows a flowchart illustrating an assembly method according to a preferred embodiment of the present invention. The assembly method is for assembly a product from modular components. Each modular component is assembled in step 160. Then the modular components may be stocked in step 170 for later use. The steps 160 and 170 may be repeated continuously until sufficient stock is obtained and can be also repeated while the balance of the assembly process is taking place. For efficient production in flow manufacturing it is desirable to minimize stock theoretically to the point that components are ready just in time for use. The use of modular components that may be used in multiple vehicle configurations means less different part designs are used and thus allows stock quantities to be reduced. Once a product order is received in step 180 or otherwise it is decided that a product will be built, then the modular components for the configuration of the ordered product are chosen in step 190. The modular components are then retrieved for building a subassembly of the product in step 200. In step 210 the subassembly is assembled. In step 220 it is determined whether upon assembly of that subassembly the product is finished. If so, then the product is delivered or otherwise disposed of at step 230. If the product does not have subassemblies but is made of a single assembly from the modular components, then this is the end of the process. However, if there is more than one subassembly, then the product may be moved to the next station in step 240. The next station may be at another location down the manufacturing line or if desired may be in the same physical location. Then the step 200 is repeated, retrieving components for another subassembly which is then assembled with the previously assembled subassembly or subassemblies. This process is continued until the product is finished.

With respect to the particular frame embodiment and loader vehicle embodiment illustrated in the figures, the process illustrated by FIG. 7 may be as follows. With respect to the frame, each of the components of the frame, including the plates of the side rails, the component parts of the front axle mount pod 60, the rear axle mount pod 70 as well as the rear module 50 may be procured and the plates cut and stocked.

If it is desired to manufacture any particular side rail as the product, such as the side rail 30, as the product to be stored for later use, the plates 33, 34, 35 and 36 may be obtained and, in the case of side plates 34 and 36, cut to shape. The walls may then be welded together as described above with reference to FIG. 6 and the product is finished. The product may then be stored for later use as a component of another product.

If the product is the frame, then the component parts are chosen and assembled in steps 160 and 170. For a given capability of a load handling vehicle in step 180, a frame 20 may require predetermined size side rails 30 and 34 and other components in step 190. Other rail sizes may be determined by the rail height 150 and length 151 as well as other parameters. These rails are retrieved in step 200 from storage along with the other component parts such as the module 50, the pods 60 and 70 and the parts 91, 92 and 9. The component parts may then be mounted on a fixture and welded. For the frame illustrated in FIG. 5, the rear axle mount pod 70 may first be welded to the rear module 50. Then the side rails 30 and 40 are mounted on the fixture along with the rest of the components.

Figure 10:
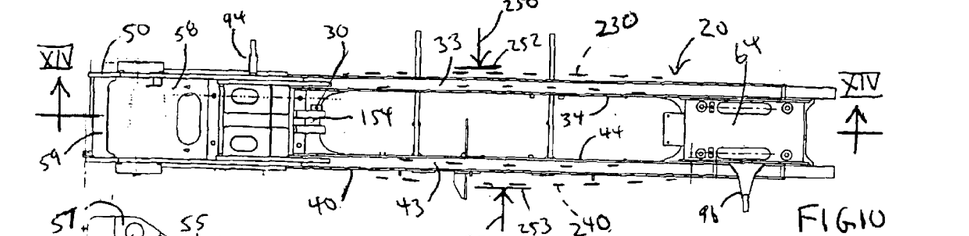
FIG. 10 is a top plan view of the frame of FIG. 4.
Figure 11:
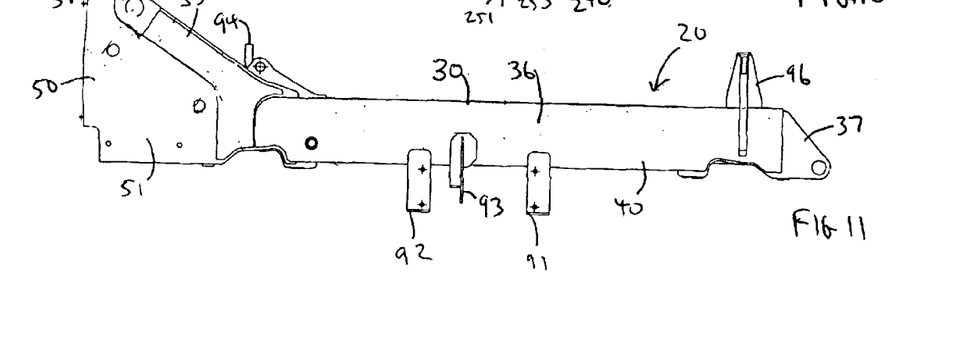
FIG. 11 is a right side elevation view of the frame of FIG. 4.
Figures 12, 13, 14:
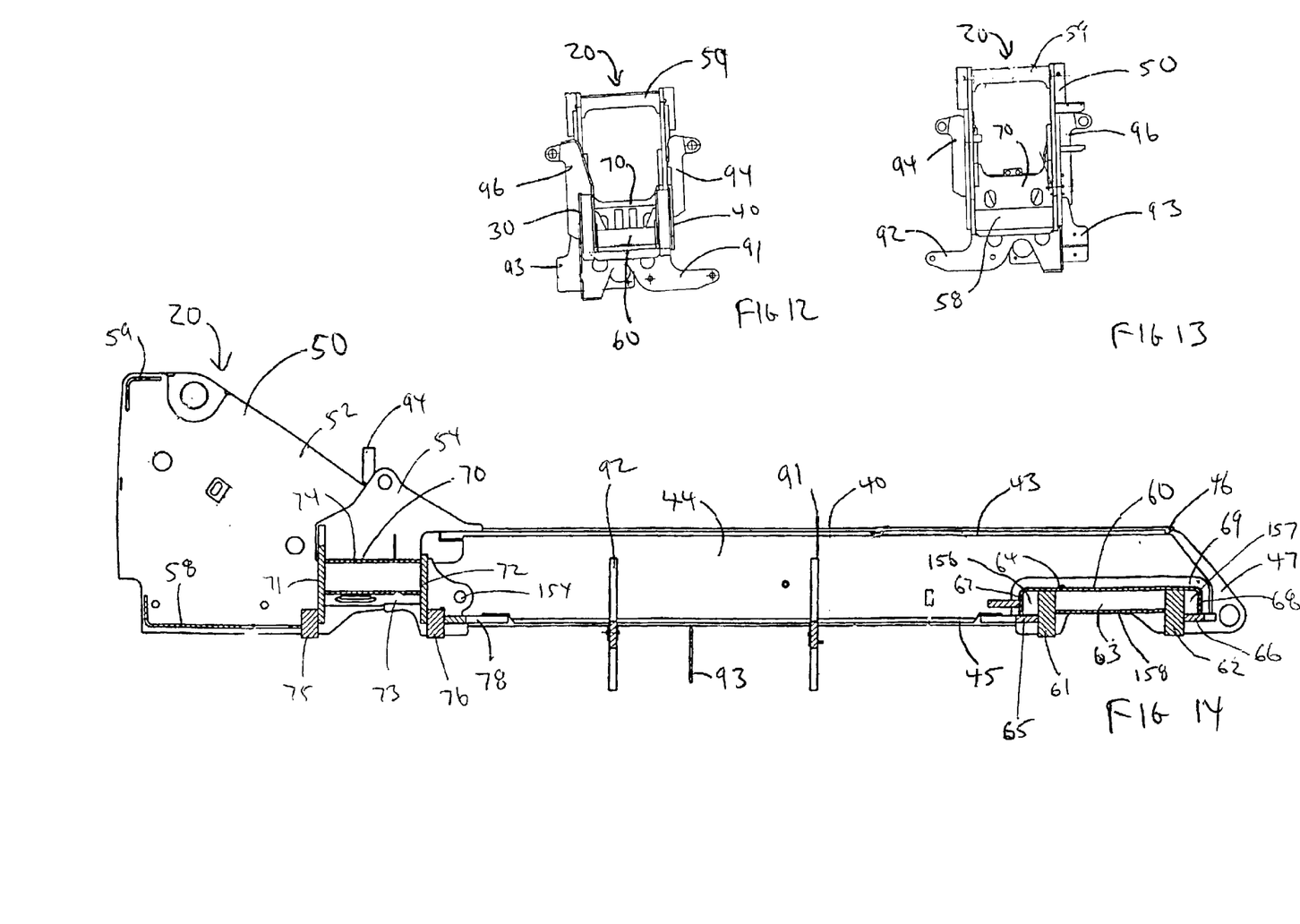
FIG. 12 is a front elevation view of the frame of FIG. 4.
FIG. 13 is a rear elevation view of the frame of FIG. 4.
FIG. 14 is a view taken along section line XIV—XIV of FIG. 10.
Figure 15:
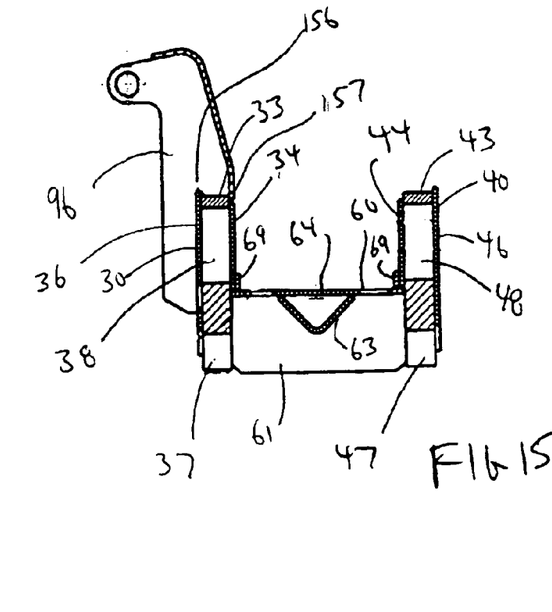
FIG. 15 is a view taken along section line XV—XV of FIG. 8.
Figure 16:
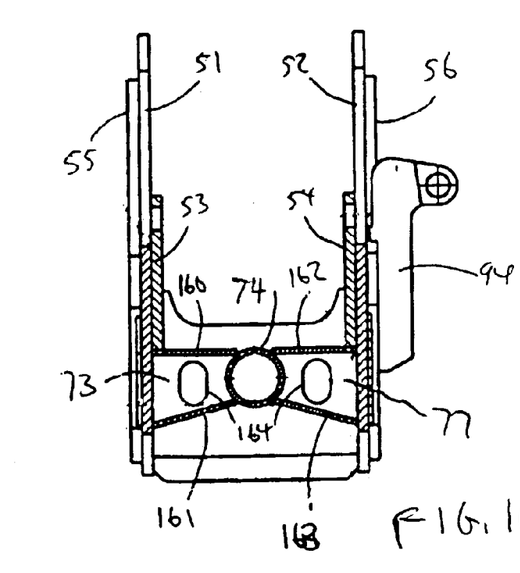
FIG. 16 is a view taken along section line XVI—XVI of FIG. 8.

As discussed above, the side rails 30 and 40 constructed according to the embodiment illustrated in FIG. 6 may have a slight outward sweep or bow. FIG. 10 shows schematically the rails in the bowed position 230 and 240 designated by dotted lines. This may facilitate assembly as it allows some space to position, or drop into place, the component parts, particularly the bulkhead frames 91 and 92 and transfer box mount 93. The frames may be then compressed together with fixture 252 and 253 in directions of 250 and 251 at their middles to bring the component parts into contact and the rear bulkhead 50 positioned at the rear ends 31 and 41 of the rails 30 and 40. With the component parts 30, 40, 60, 91, 92 and 93 held in position in a fixture, then the welds may be effected to join such components together. Note that the front pod 60 auxiliary strip 69 at this point may be positioned at the corner of the front axle mount pod 60 and the wall 34 for strength and welding. Then the module 50 and rear pod 70 may be pushed onto the balance of the frame and welded in position. Note also that the welding of the bulkhead frames 91 and 92 and the transfer box mount 93 add stiffness and torsion strength to the frame 20 and the vehicle 10.

If the product is a vehicle, the process can be configures to add the engine cab, axles, wheels and other components in a flow manufacturing process.

As a feature of the illustrated embodiment, different sizes of rails 30 and 40 may be used with a single set of sizes of the other components. This will yield a range of capacity of load handling vehicles using similar parts and a modular construction. Also the other parts may be modified to accommodate various cab designs, axle designs and boom arrangements, while reusing a number of the other component parts as desired. This modular construction in a more efficient flow type construction process is more efficient than the cell type construction process typical for load handling vehicles. This construction provides a highly stiff frame with a relatively narrow width allowing for an enhanced turning radius for the vehicle.

The straight rails as shown in the illustrated embodiments will generally be more economical to manufacture than angled rails that may have a varying height 150 along their length 151 because of lower cost of straight wall plates and easier alignment in welding of the plates. However, the present invention is not limited to straight rails or beams, or straight plates used in their construction. Indeed, it may be desirable to use such angled rails having a tapering or varying width in some applications.

The rails will generally become stiffer as the rail height 150 increases. For example, for a loader vehicle 10 constructed according to the illustrated embodiments, a lifting capability of about sixty six hundred pounds and a gross vehicle weight of about thirty thousand pounds may be achieved with a rail length 151 of about one hundred thirty one inches and a rail height 150 of about fourteen inches. By increasing the rail height 150 to about sixteen inches, a capability of lifting about eleven thousand pounds and a gross vehicle weight of about forty thousand pounds may be achieved. The capability may be increased to a gross vehicle weight of about fifty thousand pounds by increasing the rail height to about nineteen inches, even when the rail length is increased to about one hundred thirty-six inches. The lifting capability is also affected by the degree of extension of the boom and its angle to horizontal. Load charts are commonly employed by vehicle operators to determine lifting capability for various conditions. Essentially all the other major components, such as the pods 60 and 70 and the module 50, may be used in all three vehicle set-ups. Some components however may change somewhat, such as the edge 172 of the plate 56 which may be modified to accept a higher rail outer plate 46.

Attachments of structural components for the frame 20 is generally accomplished by welding. However, the type of welding may depend on the materials used and other suitable attachment methods now known or hereafter discovered may be utilized for some attachment of the components of the present inventions.

A frame, such as a loader vehicle frame, constructed according to the present inventions, has a strong, durable, compact design, improved torsion strength, and with a small turning radius. The frame is modular in design and can be quickly assembled using a flow manufacturing process and design modifications can be efficiently incorporated into the modular design.

The above description and drawings are only illustrative of preferred embodiments of the present inventions, and are not intended to limit the present inventions thereto. For example, an embodiment shown has a closed section beam formed by four plates to form a rectangular closed section, however the invention is not limited to this arrangement. In addition, an illustrated embodiment includes a single-pass beam welding operation where all weld positions are oriented in a common direction, however other welding arrangements could be used. Also, for example, a described embodiment includes a stationary beam pivot point. However other mounting arrangements could be used, such as a pivot point on a translatable carriage. Any subject matter or modification thereof which comes within the spirit and scope of the following claims is to be considered part of the present inventions.

What is claimed as new and desired to be protected by Letters Patent of the United States is:

1. A method for manufacturing a load handling vehicle having a modular structural frame comprising the steps of:
   (a) providing a plurality of components for such vehicle and frame, wherein said components include: a plurality of sizes of left side rails and right side rails, each having a closed cross-section and a front end and rear end; and a plurality of sizes of front cross rails and rear cross rails, each having a closed cross-section; at least one of said plurality of sizes of front cross rails and rear cross rails configured to fit with more than one of said plurality of sizes of left side rails and right side rails for the desired capability of the vehicle and frame; each component of at least a first portion of said components being provided in more than one size, and each component of at least a second portion of said components being modular and configured to fit more than one size of a component included in said first portion of said components;
   (b) stocking said components;
   (c) determining to build a vehicle;
   (d) determining the desired capability of the vehicle and frame;
   (e) selecting said components based on such determined capability;
   (f) retrieving said selected components from stock and bringing said selected components to an assembly location;
   (g) assembling together said selected components at said assembly location, wherein said assembling includes rigidly affixing said front cross rail between said side rails at a forward location and rigidly affixing said rear cross rail between said rails at a rearward location;
   (h) repeating step (e), (f) and (g) selecting and using at least one additional component;
   wherein at least one of said rails includes;
   a first plate, a second plate, a third plate and a fourth plate; each of said plates having respectively a length, a width, and a thickness;
   said first and second plates being arranged in an opposed position to one another, and said second and third plates being arranged in an opposed position to one another;
   said plates interconnect along their lengths to form said at least one rail having a closed cross-section and having a perimeter generally along the widths of the plates and having a rail cavity within said perimeter,
   said first plate width being greater than said second plate width, and said plates positioned with the widths of said third and fourth plates extending between, abutting and positioned generally traverse to the widths of said first and second plates, to form a plurality of welding land inside corners along the length of said at least one rail;
   a corresponding weld formed at each of said welding land corners along the lengths thereof to interconnect said plates.

2. A method as in claim 1 wherein said at least one of said rails includes both of said side rails.

3. A method as in claim 2 wherein a plurality of said welding land inside corners are oriented to open approximately toward a direction from said first plate towards said second plate.

4. A method as in claim 3 wherein each said third plate thickness and fourth plate thickness is greater than said first plate thickness and second plate thickness and said third and fourth plates are cold finished.

5. A method as in claim 4 wherein said plurality of said welds are formed simultaneously.

6. A method for manufacturing a load handling vehicle having a modular structural frame comprising the steps of:
   (a) providing a plurality of components for such vehicle and frame, wherein said components include: a plurality of sizes of left side rails and right side rails, each having a closed cross-section and a front end and a rear end; and a plurality of sizes of front cross rails and rear cross rails, each having a closed cross-section; at least one of said plurality of sizes of front cross rails and rear cross rails configured to fit with more than one of said plurality of sizes of left side rails and right side rails for the desired capability of the vehicle and frame; wherein said front cross rail is a front axle mount pod and said rear cross rail is a rear axle mount pod, each component of at least a first portion of said components being provided in more than one size, and each component of at least a second portion of said components being modular and configured to fit more than one size of a component included in said first portion of said components;
   (b) stocking said components;
   (c) determining to build a vehicle;
   (d) determining the desired capability of the vehicle and frame;
   (e) selecting said components based on such determined capability;
   (f) retrieving said selected components from stock and bringing said selected components to an assembly location;
   (g) assembling together said selected components at said assembly location, wherein said assembling includes rigidly affixing said front cross rail between said side rails at a forward location and rigidly affixing said rear cross rail between said side rails at a rearward location;
   (h) repeating step (e), (f) and (g) selecting and using at least one additional component.

7. A method as in claim 6 wherein said components include a rear module adapted to be connected to the rear ends of said side rails and to said rear axle mount pod.

8. A method as in claim 7 wherein said components include a front bulkhead frame, a rear bulkhead frame, and a transfer box mount.

9. A method as in claim 8 wherein said components are assembled by the steps of (1) affixing the rear axle mount pod to the rear module to form a rear subassembly, (2) positioning said side rails, rear subassembly, front axle mount pod, front bulkhead frame, rear bulkhead frame, and transfer box mount in a fixture, (2) compressing the side rails to contact the front axle mount pod, front bulkhead frame, rear bulkhead frame, and transfer box mount positioned between said side rails, (3) welding together the side rails to contact the front axle mount pod, front bulkhead frame, rear bulkhead frame, and transfer box mount, and (4) contacting and welding the rear subassembly to the rear ends of the rails.

10. A method as in claim 8 wherein said components include vehicle axles connected to said front and rear axle mount pods.

11. A method as in claim 10 wherein said components include wheels attached to said axles.

12. A method as in claim 11 wherein each of said side rails includes a shoe positioned to plug the rail cavity at said front end of said rail.

13. A method as in claim 12 wherein said components include a drive unit located outside of side rails and having a portion mounted to said transfer box mount.

14. A method as in claim 13 wherein said components include an operator cab located outside of said side rails opposite said drive unit and mounted to said front bulkhead frame and said rear bulkhead frame.

15. A method as in claim 13 wherein said drive unit includes drive components for transferring power from said drive unit to one or more of said axles, said drive components being mounted under and to said frame, and having a portion mounted to said transfer box mount.

16. A method as in claim 15 wherein said components include means for pivoting said front axle with respect to a longitudinal axis of the load handler, including a hydraulic cylinder connected between said front axle and a front tilt tower of said frame, said front tilt tower being affixed at an attachment position to said frame at one of said side rails proximate said forward location, and said shoe sized and shaped to extent into said rail cavity to form a reduced cross-sectional area cavity and reinforce said closed section construction at said front tilt tower attachment position.

17. A method for manufacturing a load handling vehicle having a modular structural frame comprising the steps of;
    (a) providing a plurality of components for such vehicle and frame, each component of at least a first portion of said components being provided in a more than one size, and each component of at least a second portion of said components being modular and configured to fit more than one size of a component included in said first portion of said components;
    (b) stocking said components;
    (c) determining to build a vehicle;
    (d) determining the desired capability of the vehicle and frame;
    (e) selecting said components based on such determined capability;
    (f) retrieving said selected components from stock and bringing said selected components to an assembly location;
    (g) assembling together said selected components at said assembly location;
    wherein said components include: a plurality of sizes of left side rails and right side rails, each having a closed cross-section and a front end and rear end; and at least one front cross rail and at least one rear cross rail, each having a closed cross-section; said front cross rail and rear cross rail configured to fit with more than one of said plurality of sizes of left side rails and right side rails for the desired capability of the vehicle and frame;
    wherein step (g) includes rigidly affixing said front rail between said side rails at a forward location and rigidly affixing said rear cross rail between said side rails at a rearward location;
    wherein at least one of said rails includes:
    a first plate, a second plate, a third plate and a fourth plate;
    each of said plates having respectively a length, a width, and a thickness;
    said first and second plates being arranged in an opposed position to one another, and said second and third plates being arranged in an opposed position to one another;
    said plates being interconnected along their lengths to form said at least one rail having a closed cross-section and having a perimeter generally along the widths of the plates and having a rail cavity within said perimeter;
    said first plate width being greater than said second plate width, and said plates positioned with the widths of said third and fourth plates extending between, abutting and positioned generally traverse to the widths of said first and second plates, to form a plurality of welding land inside corners along the length of said at least one rail;
    corresponding weld formed at each of said welding land inside corners along the lengths thereof to interconnect said plates.

18. A method as in claim 17 wherein said at least one of said rails includes both of said side rails.

19. A method as in claim 17 wherein a plurality of said welding land inside corners are oriented to open approximately toward a direction from said first plate towards said second plate.

20. A method as in claim 17 wherein each said third plate thickness and fourth plate thickness is greater than said first plate thickness and second plate thickness.

21. A method as in claim 17 wherein at least one of said plates is cold finished.

22. A method as in claim 17 wherein said plurality of said welds are formed simultaneously.

23. A method as in claim 17 wherein said components include: a plurality of sizes of left side rails and a plurality of sizes of right side rails, each having a closed cross-section and a front end and a rear end; and a plurality of sizes of front cross rails and a plurality of sizes of rear cross rails, each having a closed cross-section; at least one of said plurality of sizes of front cross rails and a plurality of sizes of rear cross rails configured to fit with more than one of said plurality of sizes of left side rails and a plurality of sizes of right side rails for the desired capability of the vehicle and frame.

24. A method for manufacturing a load handling vehicle having a modular structural frame comprising the steps of:
    (a) providing a plurality of components for such vehicle and frame, each component of at least a first portion of said components being provided in a more than one size, and each component of at least a second portion of said components being modular and configured to fit more than one size of a component included in said first portion of said components;

(b) stocking said components;

(c) determining to build a vehicle (d) determining the desired capability of the vehicle and frame;

(e) selecting said components based on such determined capability;

(f) retrieving said selected components from stock and bringing said selected components to an assembly location;

(g) assembling together said selected components at said assembly location;

wherein said components include: a plurality of sizes of left side rails and right side rails, each having a closed cross-section and a front end and a rear end; and a plurality of sizes of front cross rails and rear cross rails, each having a closed cross-section; at least one of said plurality of sizes of front cross rails and rear cross rails configured to fit with more than one of said plurality of sizes of left side rails and right side rails for the desired capability of the vehicle frame;

wherein said front cross rail is a front axle mount pod and said rear cross rail is a rear axle mount pod.

25. A method as in claim 24 wherein said components include a rear module adapted to be connected to the rear ends of said side rails and to said rear axle mount pod.

26. A method as in claim 25 wherein said components include a front bulkhead frame, a rear bulkhead frame, and a transfer box mount.

27. A method as in claim 26 wherein said components are assembled by the steps of (1) affixing the rear axle mount pod to the rear module to form a rear subassembly, (2) positioning said side rails, rear subassembly, front axle mount pod, front bulkhead frame, rear bulkhead frame, and transfer box mount in a fixture, (2) compressing the side rails to contact the front axle mount pod, from bulkhead frame, rear bulkhead frame, and transfer box mount positioned between said side rails, (3) welding together the side rails to contact the front axle mount pod, front bulkhead frame, rear bulkhead frame, and transfer box mount, and (4) contacting and welding the rear subassembly to the rear ends of the rails.

28. A method as in claim 26 wherein said components include vehicle axles connected to said front and rear axle mount pods.

29. A method as in claim 28 wherein said components include wheels attached to said axles.

30. A method as in claim 29 wherein each of said side rails includes a shoe positioned to plug the rail cavity at said front end of said rail.

31. A method as in claim 30 wherein said components include a drive unit located outside of said side rails and having a portion mounted to said transfer box mount.

32. A method as in claim 31 wherein said components include an operator cab located outside of said side rails opposite said drive unit and mounted to said front bulkhead frame and said rear bulkhead frame.

33. A method as in claim 31 wherein said drive unit includes drive components for transferring power from said drive unit to one or more of said axles, said drive components being mounted under and to said frame, and having a portion mounted to said transfer box mount.

34. A method as in claim 33 wherein said components include means for pivoting said front axle with respect to a longitudinal axis of the load handler, including a hydraulic cylinder connected between said front axle and a front tilt tower of said frame, said front tilt tower being affixed at an attachment position to said frame at one of said side rails proximate said forward location, and said shoe sized and shaped to extent into said rail cavity to form a reduced cross-sectional area cavity and reinforce said closed section construction at said front tilt tower attachment position.

35. A method as in claim 29 wherein said components include: a plurality of sizes of left side rails and a plurality of sizes of right side rails, each having a closed cross-section and a front end and a rear end; and a plurality of sizes of front cross rails and a plurality of sizes of rear cross rails, each having a closed cross-section; at least one of said plurality of sizes of front cross rails and a plurality of sizes of rear cross rails configured to fit with more than one of said plurality of sizes of left side rails and a plurality of sizes of right side rails for the desired capability of the vehicle and frame.

36. A method for manufacturing a load handling vehicle having a modular structural frame comprising the step of:

providing a plurality of components for such vehicle and frame, each component of at least a first portion of said components being provided in a more than one size, and each component of at least a second portion of said components being modular and configured to fit more than one size of a component included in said first portion of said components;

wherein said components include: at least one side rail, each having a closed cross-section and a front end and rear end;

wherein at least one of said rails includes:

a first plate, a second plate, a third plate and a fourth plate;

each of said plates having respectively a length, a width, and a thickness;

said first and second plates being arranged in an opposed position to one another;

said plates being interconnected along their lengths to form said at least one rail having a closed cross-section and having a perimeter generally along the widths of the plates and having a rail cavity within said perimeter;

said first width being greater than said second plate width, and said plates positioned with the widths of said third and fourth plates extending between, abutting and positioned generally traverse to the widths of said first and second plates, to form a plurality of welding land inside corners along the length of said at least one rail;

a corresponding weld formed at each of said welding land inside corners along the lengths thereof to interconnect said plate.

* * * * *